United States Patent
Howlett

(10) Patent No.: US 7,514,031 B2
(45) Date of Patent: Apr. 7, 2009

(54) SUCTION SLEEVE EXTENSION FOR A TAKE-OFF DEVICE

(75) Inventor: Mark DeCosta Howlett, Barrie (CA)

(73) Assignee: Husky Injection Molding Systems, Inc. (CA)

(*) Notice: Subject to any disclaimer, the term of this patent is extended or adjusted under 35 U.S.C. 154(b) by 722 days.

(21) Appl. No.: 11/153,416

(22) Filed: Jun. 16, 2005

(65) Prior Publication Data
US 2005/0230881 A1  Oct. 20, 2005

Related U.S. Application Data

(62) Division of application No. 10/323,947, filed on Dec. 20, 2002, now Pat. No. 7,104,779.

(51) Int. Cl.
*B29C 45/40* (2006.01)

(52) U.S. Cl. .............. 264/334; 425/534; 425/436 RM; 425/556

(58) Field of Classification Search .......... 425/444, 425/436 RM, 556, 588, 534, 533; 264/334
See application file for complete search history.

(56) References Cited

U.S. PATENT DOCUMENTS

| | | | |
|---|---|---|---|
| 4,101,254 | A | 7/1978 | Wiltshire |
| 4,364,895 | A | 12/1982 | Underwood |
| 4,660,801 | A | 4/1987 | Schad |
| 5,234,328 | A | 8/1993 | Willson et al. |
| 5,447,426 | A | 9/1995 | Gessner et al. |
| 5,948,341 | A | 9/1999 | Diamond et al. |
| 6,123,538 | A | 9/2000 | Kutalowski |
| 6,139,789 | A | 10/2000 | Neter et al. |
| 6,186,736 | B1 | 2/2001 | Lust et al. |
| 6,190,157 | B1 | 2/2001 | Hofstetter et al. |
| 6,391,244 | B1 | 5/2002 | Chen |

*Primary Examiner*—Yogendra Gupta
*Assistant Examiner*—Emmanuel S Luk
(74) *Attorney, Agent, or Firm*—Katten Muchin Rosenman LLP

(57) ABSTRACT

An improved take-off device for an injection molding machine that includes an extensible sleeve for extending a suction channel during transfer of parts from the mold core assembly to the take-off device, the tube being retractable after the parts have been transferred.

5 Claims, 11 Drawing Sheets

SUCTION SLEEVE EXTENSION FOR A TAKE-OFF DEVICE

This application is a division of U.S. application Ser. No. 10/323,947, filed Dec. 20, 2002, now U.S. Pat. No. 7,104,779.

BACKGROUND OF THE INVENTION

1. Field of the Invention

The present invention relates to method and apparatus by which a take-off device efficiently transfers a molded article from the mold of an injection-molding machine. More particularly, the present invention relates to method and apparatus by which a suction sleeve extension ensures that the take-off device efficiently and reliably extracts the molded article from the mold.

2. Related Art

It is well known in the art of injection molding to transfer molded articles from a mold to a take-off device using suction to draw the article being released from a core pin into a tube on the take-off device. The take-off device is usually attached to a robot arm that enters into the space between the mold halves when the mold is open.

FIG. 1A shows an example of a known device used to transfer parts from a mold to a take-off device. A single take-off tube 74 mounted on a take-off plate 72 in a manner known in the art. In this FIG. 1A, a molded part 50 has been fully transferred into cooling tube 74 and ejector rail 14 is fully retracted. When part 50 is sufficiently cooled, rail 14 is moved upwardly in the drawing to engage a lip 52 of part 50 and discharge it from the tube 74 in a manner that is well understood in the art. A plug 8 is placed at the bottom of tube 74 and bolted to take-off plate 72. A port 10 in plug 8 provides a suction source to the tube 74 to draw parts into the tube 74. Cooling channel 12 provides coolant to the tube 74 to cool part 50 while in the tube 74. A sleeve 16 surrounds the tube 74 to confine the coolant in the cooling channel 12 in a manner that is well known in the art. However, in certain circumstances, the articles may not transfer properly using the presently known suction transfer devices.

Referring first to FIG. 1, a known take-off device 62 transfers molded articles 50 (which are being removed from core pins 38 by neck rings 98) by providing suction through ports 10 to the tubes 74. In certain circumstances, however, the articles 50 may not transfer properly. For example, if the molded article is of an irregular shape the suction provided in the tube 74 may be insufficient to draw the molded article into the tube 74 because of loss of suction between the core pins 38 and the tubes 74 due to the irregular shape of the molded article. In other circumstances, it may not be possible to bring the take-off device 62 into close proximity to the core pins 38 because of the need to maintain adequate clearance between the mold half 20 and the take-off device 62. In this situation, the transferring part 50 may drop out of alignment with the tube 74 and either jam against an edge of the take-off device 62 or even fall out of the mold half 20. Not only may the part be lost or malformed, the entire machine may be jammed, necessitating costly shut-downs and repairs.

FIG. 2 helps to illustrate these potential problems. The part 50 is formed on mold core 38. Neck ring 98 mounted on slide 96 cooperates with mold core 38 to form the neck portion of part 50. Slide 96 and neck ring 98 slide forward towards take-off device 62 to remove part 50 from mold core 38. As the neck ring 98 moves forward it separates to release the part 50. Neck ring 98 is shown in its open position where it is releasing part 50 so that it may be received by take-off tube 74. At this point, the distance between tube 74 and the releasing position of the neck ring 98 is significant with respect to the length of part 50. If there is a problem releasing the part 50 from the neck ring 98, the part 50 may not properly align with the tube 74 and either fall out of the mold or jam against the take-off device 62. The suction provided by the channel 10 may be insufficient to overcome this alignment problem because of significant losses in the space between the core 38 and the take-off device 62.

With the known take-off devices 62 shown in FIGS. 1, 1A and 2, there is nothing to prevent loss of suction in the space between the core pins 38 and the end of the tubes 74. When the tubes 74 and the core pins 38 cannot be brought into close proximity, or if the part 50 has an irregularly shaped outer surface, there may be insufficient suction and thereby cause the molded articles to transfer improperly.

Several patents teach other examples of devices used to transfer parts from a mold to a take-off device. U.S. Pat. No. 4,364,895 to Underwood discloses a mechanical ejection device that includes an air cylinder for providing air to the base of the article being ejected so as to minimize distortion of the article while it is being ejected from the mold.

U.S. Pat. No. 4,660,801 to Schad, assigned to the present assignee, discloses a mechanism for ejecting a cup-shaped work piece from a core. A core sleeve on the core is moved forward by fluid pressure to initiate release of the work piece from the core. As the core sleeve moves forward, it opens a fluid channel through the side of the core. Fluid through this side channel impinges on an inner surface of the work piece and assists in the removal of the work piece from the core.

U.S. Pat. No. 5,447,426 to Gessner et al., assigned to the present assignee, discloses a take-off device including an ejector.

U.S. Pat. No. 5,948,341 to Diamond et al., assigned to the present assignee, discloses apparatus for removing parts from a mold using a tool plate and pressurized air to move the part from the mold onto a retention apparatus.

U.S. Pat. No. 6,123,538 to Kutalowski, assigned to the present assignee, discloses a cooling device for a take-off device.

U.S. Pat. No. 6,391,244 to Chen uses a blocking portion on a take-off plate to prevent ejection of the preforms from the cooling tubes until the preforms have been partially separated from the cooling tubes.

However, nothing in the teachings above will ensure an efficient, reliable, and rapid transfer of parts from a mold to a take-off device.

SUMMARY OF THE INVENTION

According to a first aspect of the present invention, a take-off device for receiving a plurality of molded articles comprises a plate having a first surface and a plurality of hollow tubes attached to the first surface of the plate. Each hollow tube has a base portion and a central portion for receiving a molded article. A suction port is connected to a base portion of the hollow tube. An ejecting structure is configured for ejecting the molded article from the hollow tube. The ejecting structure may comprise an ejector rail mounted to the plate and movable along an axis substantially perpendicular to the first surface. The ejector rail is selectively positionable in a retracted position or an extended position. Apertures in the ejector rail correspond to the hollow tubes and sleeves are associated with the hollow tubes. The sleeves are attached to the ejector rail and extend around the hollow tubes when the ejector rail is in the retracted position and extend out from the hollow tubes when the rail is in the extended position, however, preferably with a portion of the sleeves still remaining around the hollow tubes. The sleeves, when in the extended position, combine with the hollow tubes and the suction port to create a suction channel for assisting transfer of molded articles from a mold and into the hollow tubes.

According to another aspect of the present invention, retractable means are provided to enable the extension of a suction channel when transferring parts into a take-off device. In particular, this aspect of the present invention provides a take-off device for receiving molded articles from a mold that comprises suction structure for assisting the transfer of molded articles from the mold to the takeoff device. The suction structure includes extensible structure for extending the suction structure around a portion of the molded articles when transferring the molded articles from the mold to the take-off device. The extensible structure being retractable when the molded articles have been transferred to the take-off device.

According to yet another aspect of the present invention, a suction channel extension for use with a injection molding machine take-off device is provided. The take-off device includes a support structure configured to at least partially enclose a molded article that is to be deposited thereon, the support structure also being configured to be coupled to a take-off plate. The suction channel extension coupled to the support structure and configured to form at least a partial vacuum channel between an outer surface of the molded article and surfaces of the corresponding support structure.

According to yet another aspect of the present invention, an injection molding machine includes a take-off plate having a plurality of take-off tubes configured to receive a plurality of molded articles. The injection molding machine further includes a plurality of mold cavities, a plurality of mold cores, the take-off tubes configured to receive a plurality of molded articles from said plurality of mold cores. A vacuum structure provides a suction force to attract the plurality of molded articles to said plurality of take-off tubes. A plurality of suction channel extensions each configured to be movable between an extended position and a retracted position, in the extended position, each suction channel extension being configured to provide at least a partial vacuum channel between an outer surface of a corresponding molded article and an outer surface of the corresponding take-off tube.

According to yet another aspect of the present invention, a method according to the present invention includes depositing a plurality of molded articles in a corresponding plurality of tubes. The method includes the steps of causing relative movement between a plurality of suction channel extensions and the plurality of molded articles to form a plurality of extended suction channels between respective outer surfaces of the plurality of molded articles and surfaces of the corresponding tubes, and providing a suction force to an interior of each of the tubes to cause the plurality of molded articles to move into the plurality of tubes.

In its preferred embodiment, the present invention advantageously provides a suction sleeve extension to a take-off device, and a method for its operation, in order to overcome the problems with known devices.

DETAILED DESCRIPTION OF THE PRESENTLY PREFERRED EMBODIMENTS

Figure 1:
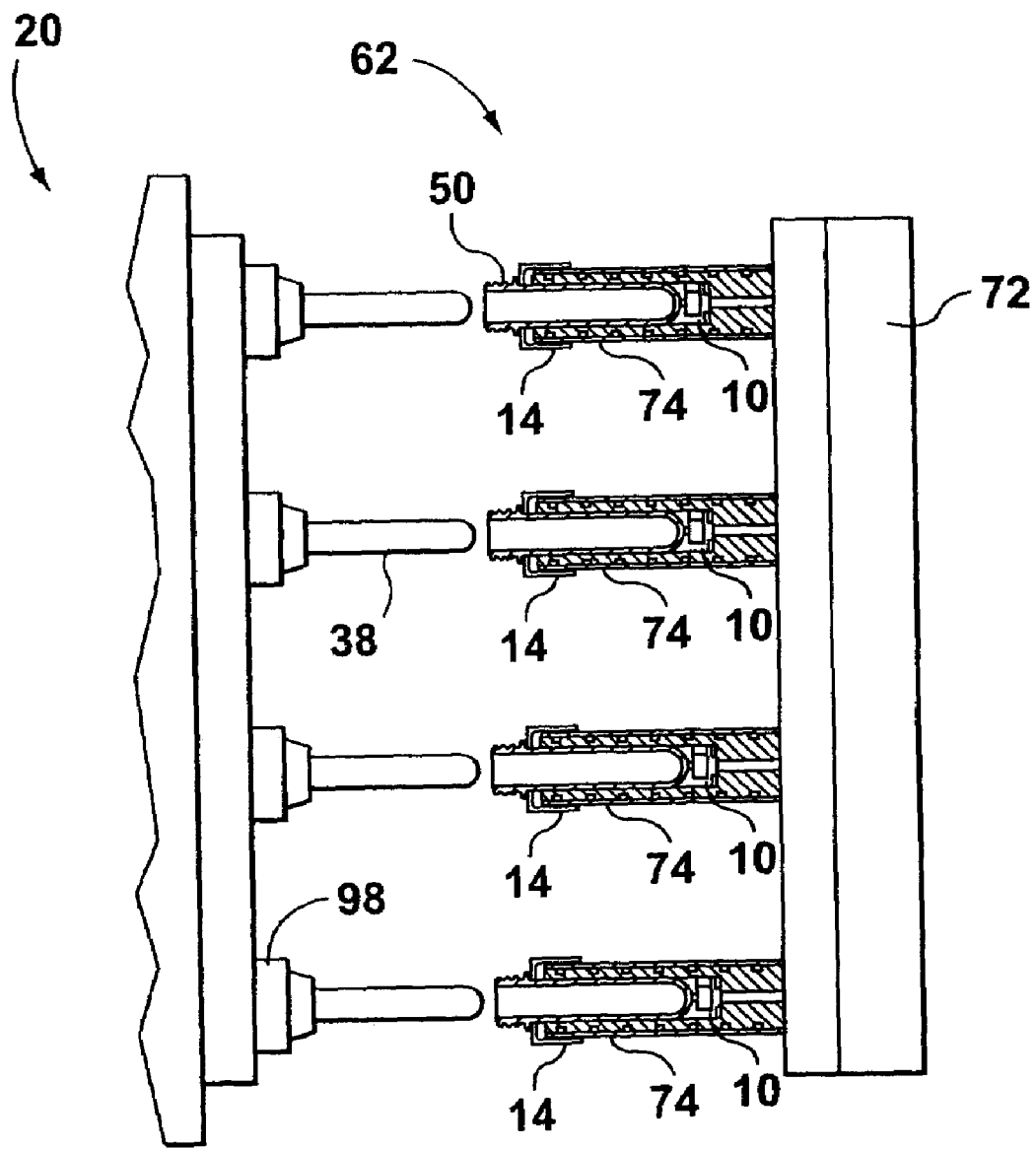
FIG. 1 is a schematic sectional view of a mold core and known take-off device with the molded articles transferred to the take-off.

In general, the present invention will be described with respect to take-off device for extracting plastic molded parts (for example, plastic preforms) from a mold device. However, the present invention may find applicability in many different molding arts.

Briefly, the preferred embodiments of the present invention utilize a suction sleeve extension to follow the preform as it is extracted from the mold cavity in order to ensure proper contact and holding force on the preform as it is moved to the take-off device.

The present invention overcomes the above-described problems by ensuring that the suction created by channel 10 is not dissipated in the region between the core 38 and the take-off device 62, but rather is largely confined in a channel as the molded article enters an opening therein. The present invention provides means to ensure that the molded articles 50 are reliably transferred from the core pins 38 to the take-off device 62.

Figure 1A:
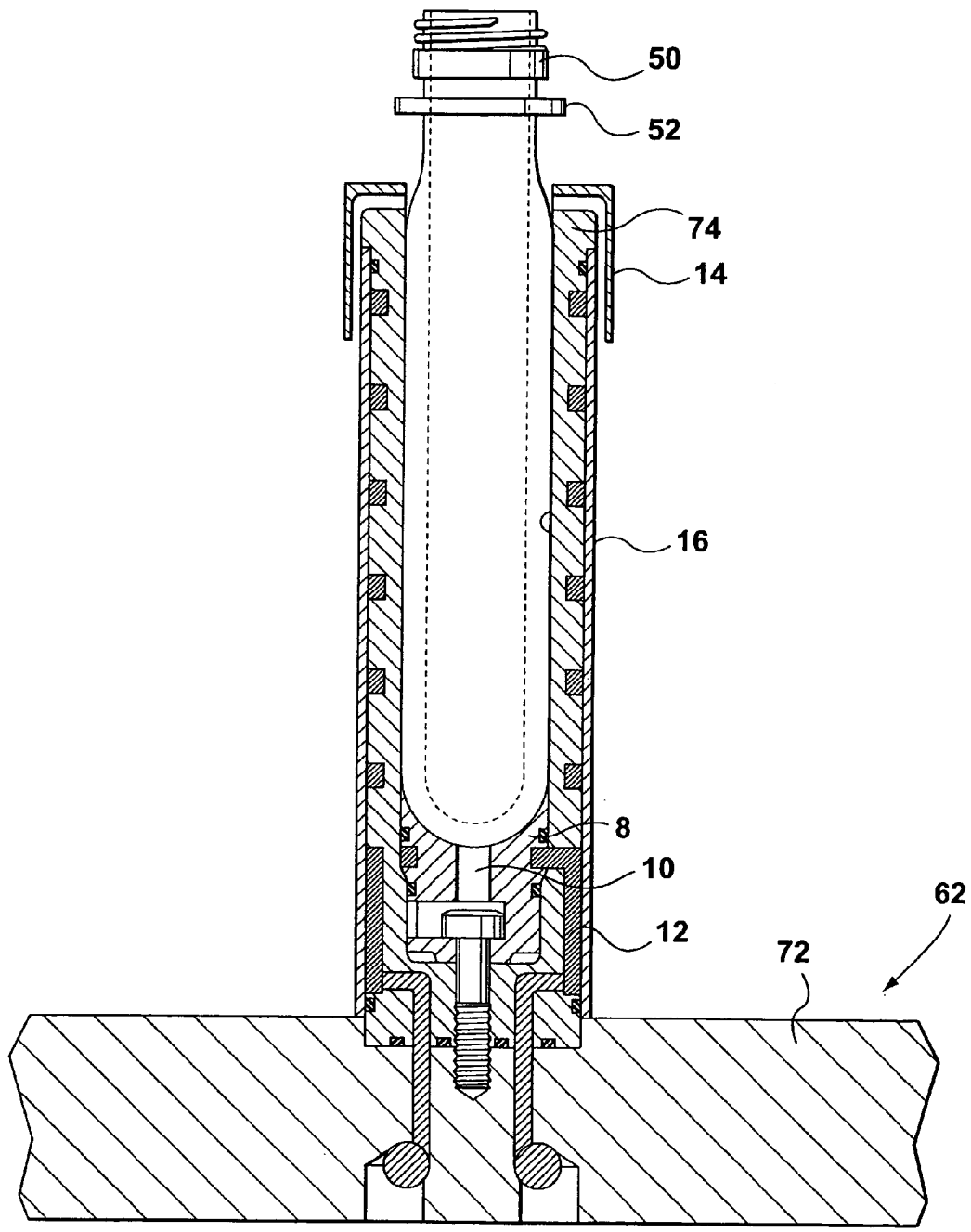
FIG. 1A is a sectional view of a portion of a known take-off device with a molded part in the take-off tube.
Figure 2:
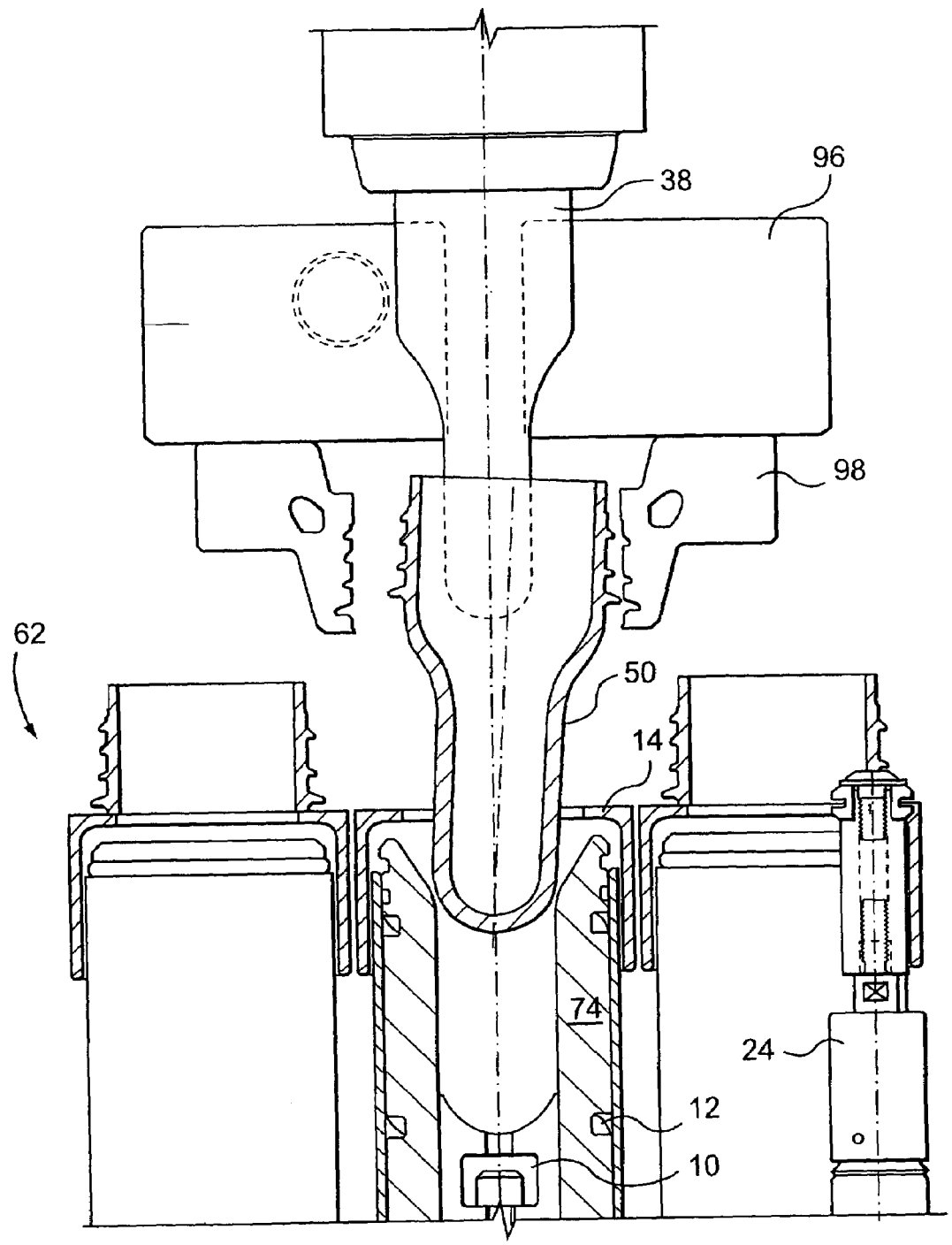
FIG. 2 is a schematic illustration of a molded article part transfer problem using a known take-off device.
Figure 3:
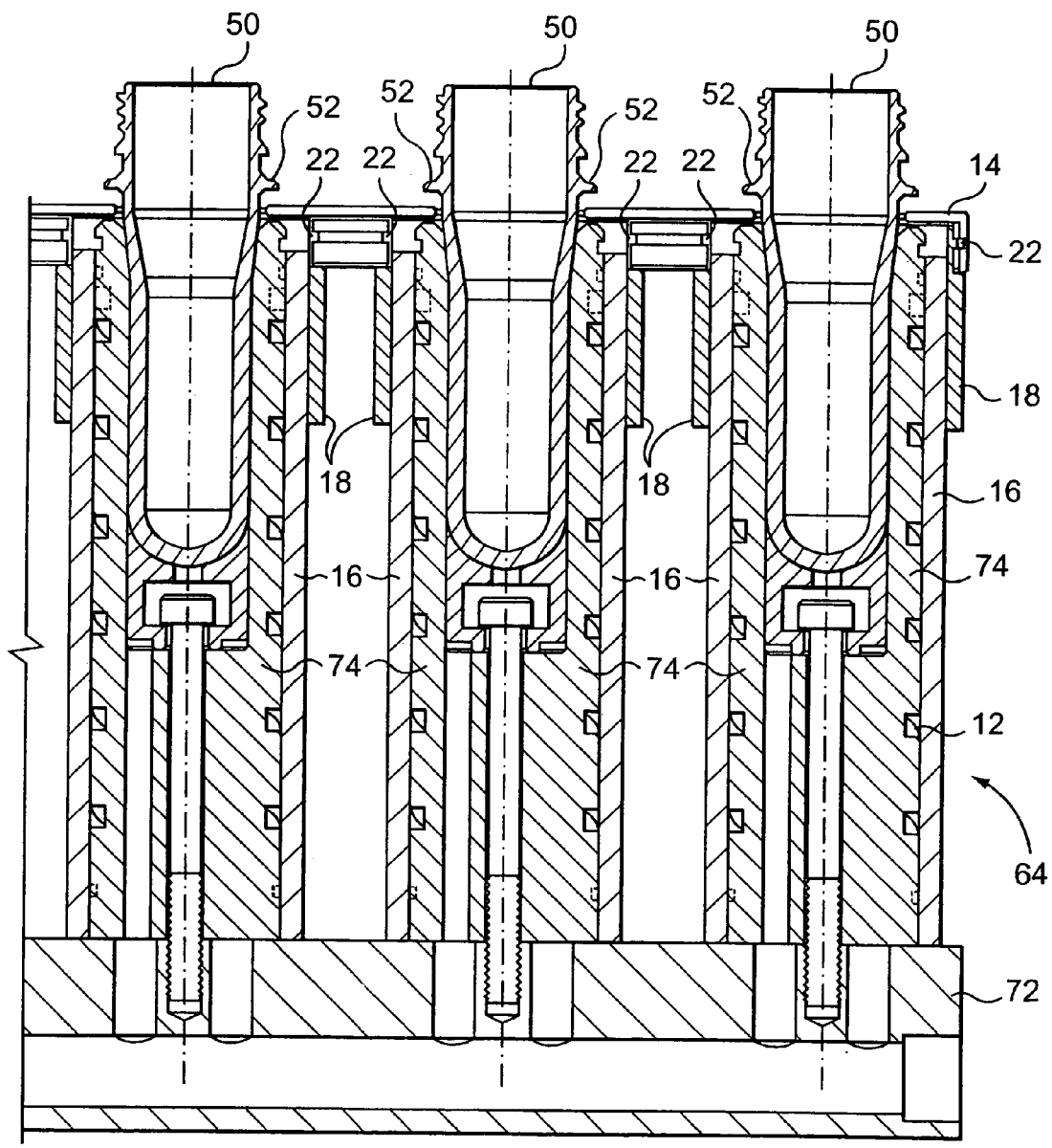
FIG. 3 is a sectional view of a portion of a take-off device modified in accordance with an embodiment of the present invention.

FIG. 3 shows a take-off device 64 similar to the take-off device 62 of FIG. 1A, but modified to include sleeves 18 in accordance with an embodiment of the present invention. The sleeves 18 are preferably cylindrical and have an inner surface that closely surrounds an outer surface of the sleeves 16 surrounding tubes 74. The sleeves 18 have an inner circumference that preferably sealingly engages the outer circumferential surface of the sleeves 16, but still permits the sleeves 18 to extend and retract with the ejector rail 14. The sleeves 18 are preferably made of lightweight plastic or sheet metal as the weight of the take-off device 62 should be kept to a minimum. The sleeves 18 are shown attached to rail 14 by detents 22. However, any suitable means could be used to attach the sleeves 18 to the rail 14.

Figure 4:
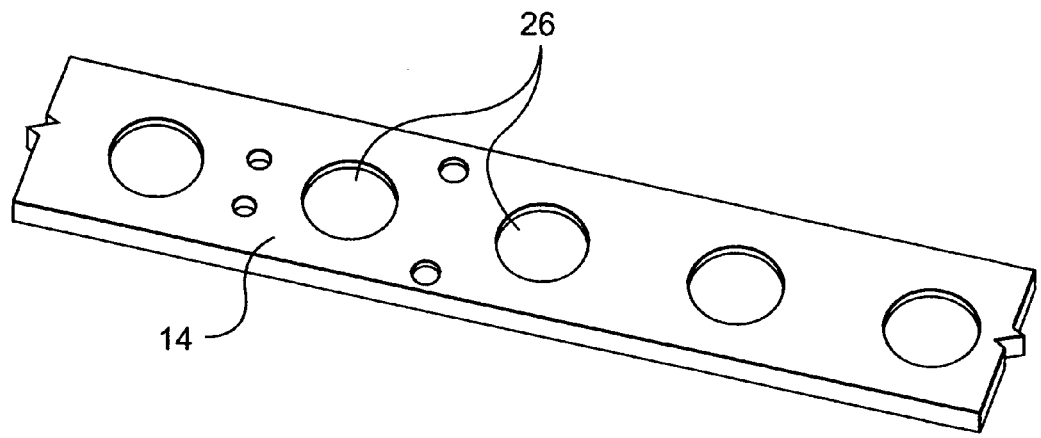
FIG. 4 is a perspective view of a take-off ejector rail.

Referring to FIG. 4, a perspective view of an unmodified ejector rail 14, the rail 14 has a plurality of apertures 26. Each aperture 26 has a diameter slightly larger than a major diameter of the part 50 being transferred. This enables the major portion of the part 50 to pass through the aperture 26 and into a tube 74. The diameter of the aperture 26 is smaller than the diameter of a ridge area 52 (see FIG. 1A) on the part 50 so that when the rail 14 is extended with a part in tube 74, the rail engages the ridge area 52 of the part 50 to discharge part 50 from the take-off device 62.

The rail 14 is preferably made of lightweight material such as extruded aluminum as it is preferable to minimize the weight of the robot arm to which it is attached, to ensure that the arm can be moved rapidly.

Figure 5:
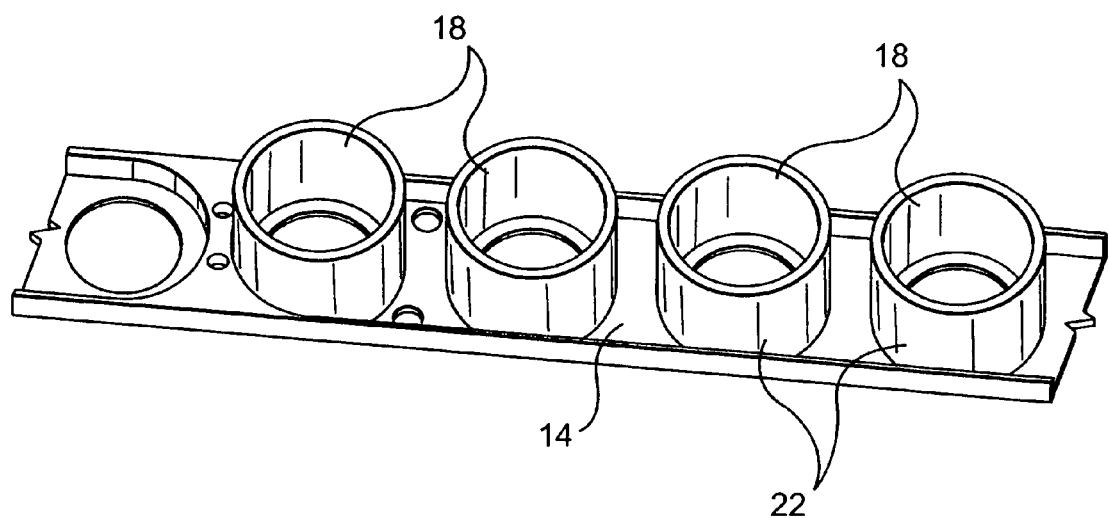
FIG. 5 is a perspective view of a take-off ejector rail when modified in accordance with the present invention.

Referring to FIG. 5, a perspective view of the ejector rail 14 of FIG. 4 is shown that has been modified in accordance with an embodiment of the invention, and in particular has cylindrical suction sleeves 18 attached thereto. The sleeves 18 may be of lightweight plastic or metal and should not add appreciably to the weight of the robotic arm. The sleeves 18 are shown attached using detents 22 but many other forms of attachment could be used. A sleeve 18 is provided for each tube 74 on the take-off plate 72.

Figure 6:
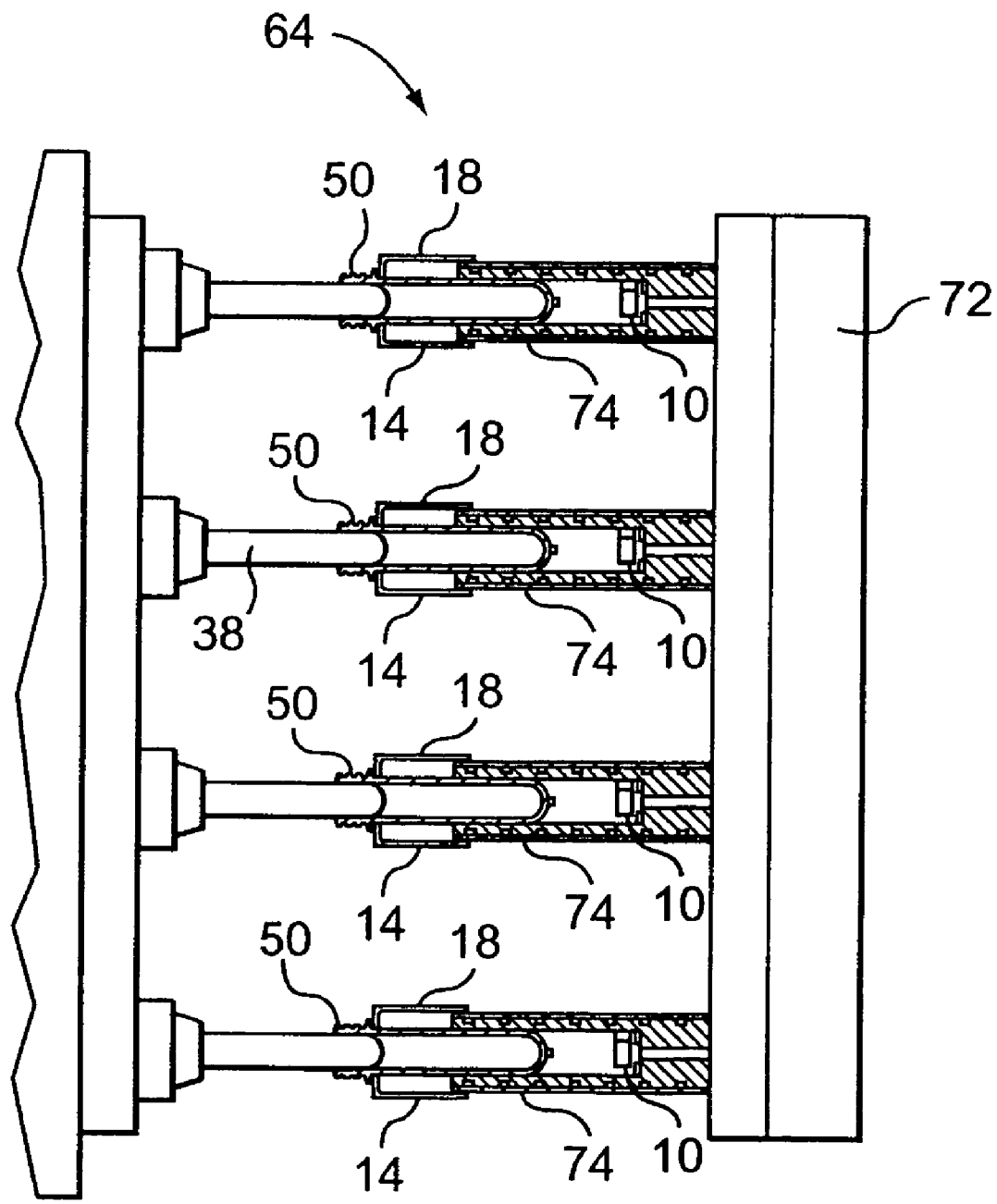
FIG. 6 is a schematic illustration of the take-off device of FIG. 2, when modified in accordance with an embodiment of the invention of FIG. 3.

As shown in FIG. 6, the ejector rail 14 with attached sleeves 18 is moved towards mold pins 38 to receive the molded articles 50. The sleeves 18 provide a substantially unbroken continuation of the tubes 74 so that minimal suction is lost within the suction zone created by the tubes 74 and sleeves 18. This significantly improves the reliability of the transfer of parts 50 from the mold pins 38 to the tubes 74.

Figure 7:
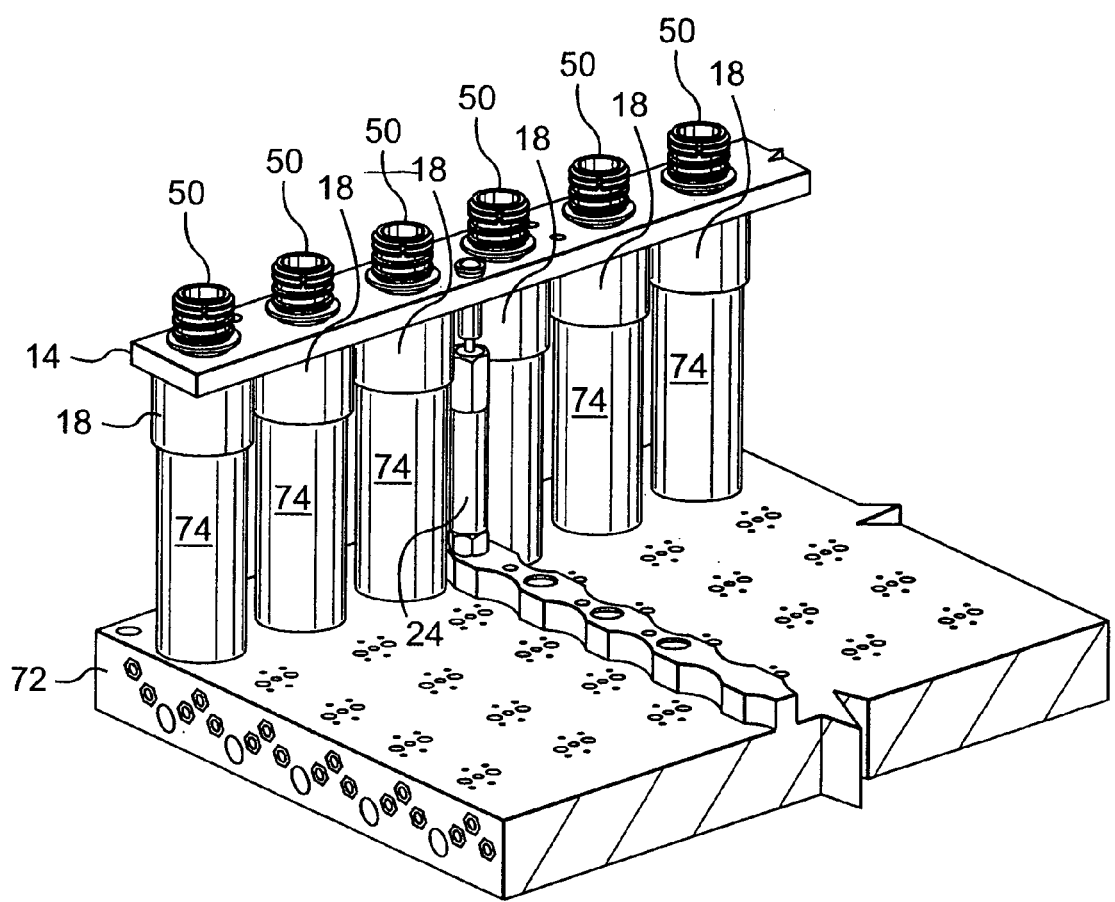
FIG. 7 is a perspective view of the take-off device in accordance with the invention.

FIG. 7 shows a mechanism for moving the ejector rail 14. Pneumatic actuators 24 (only one is shown for clarity) are attached to the ejector rails 14 and raise and lower the ejector rail 14 and attached sleeves 18. The operation of the actuators 24 will be described more fully below.

Figure 8:
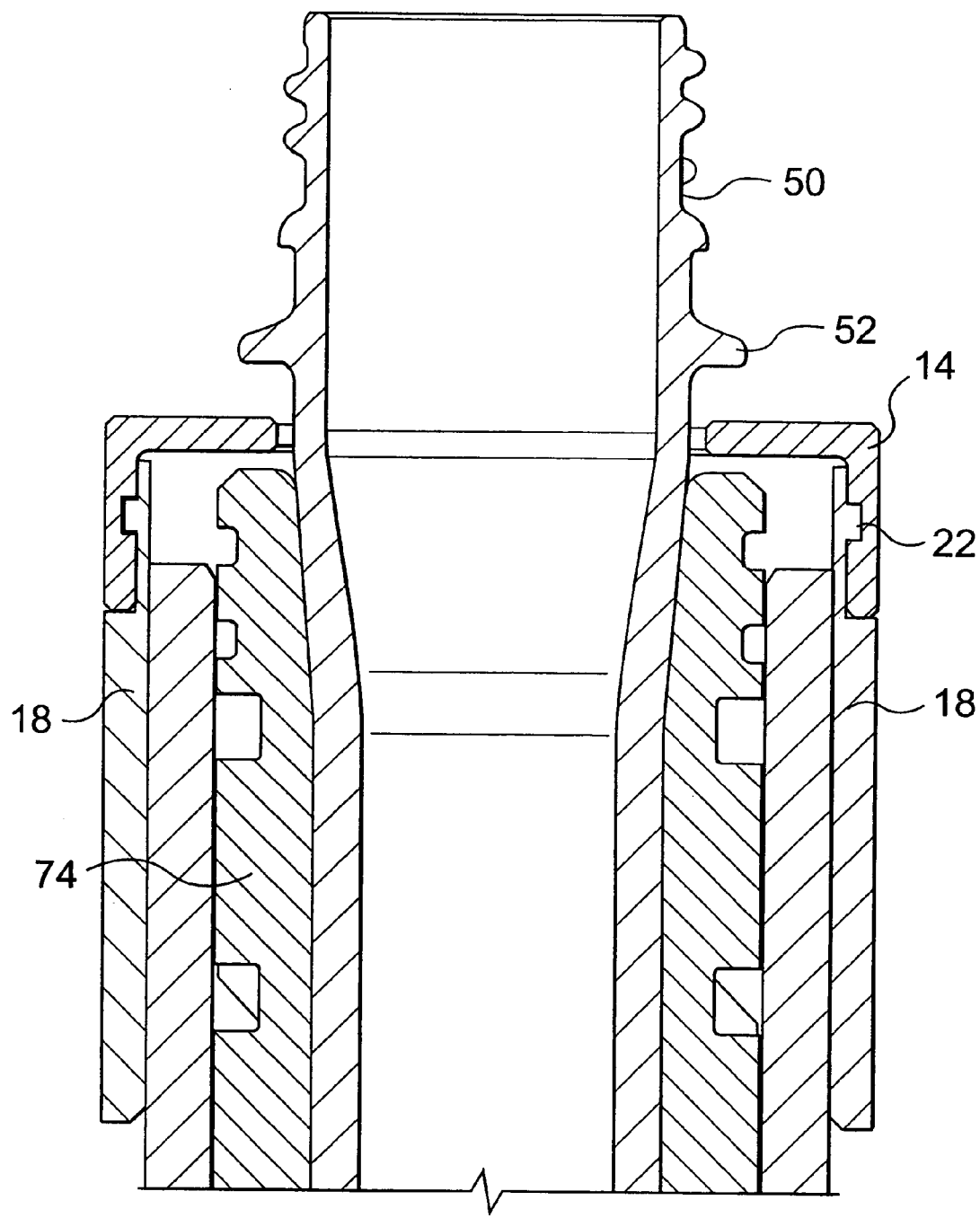
FIG. 8 is a sectional view of a portion of the take-off tube with the suction sleeve in a retracted position.

FIG. 8 shows tube 74 with the ejector rail 14 and sleeve 18 in a retracted position. The sleeve 18 is attached to the rail 14 by detent 22 that fits within a corresponding groove in rail 14.

Figure 9:
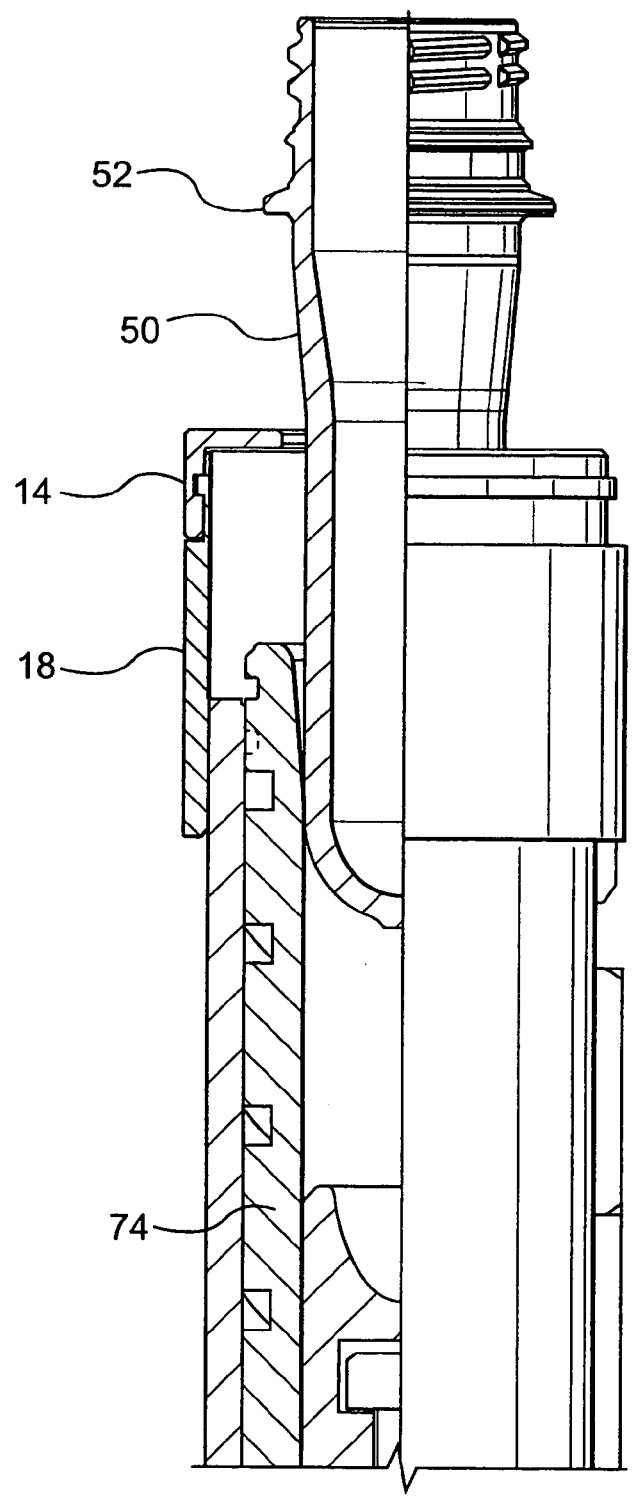
FIG. 9 is a sectional view of a portion of the take-off tube with the suction sleeve in an extended position.

FIG. 9 shows tube 74 with the ejector rail 14 and sleeve 18 in an extended position ready to receive a molded part 50.

In operation, the halves of the mold (not shown) are opened and the take-off device 64 is moved into a part-receiving position within the mold by a robotic arm (not shown). When the device 64 has reached the part-receiving position, the pneumatic actuators 24 are activated to move the ejector rail 14 and sleeves 18 into the extended position shown schematically in FIG. 6. Suction is then applied through port 10 to create a suction channel through sleeve 18 and tube 74 to draw the part 50 (being released off of core pins 38 by neck rings 98) into the tube 74. When the part 50 has fully entered the passage created by sleeve 18 and tube 74, the hydraulic actuators 24 are activated to retract the rails 14 and sleeves 18. The suction provided through port 10 is maintained while the actuators 24 are retracting the rails 14 and sleeves 18 so that the part is fully drawn into the tubes 74.

After the robotic arm removes the take-off device 64 from between the mold halves, the molds can be closed to form more parts 50, and the parts 50 on the take-off device 64 may be ejected from the take-off device 64 by extending the rails 14 in a manner well known in the art.

Figure 10:
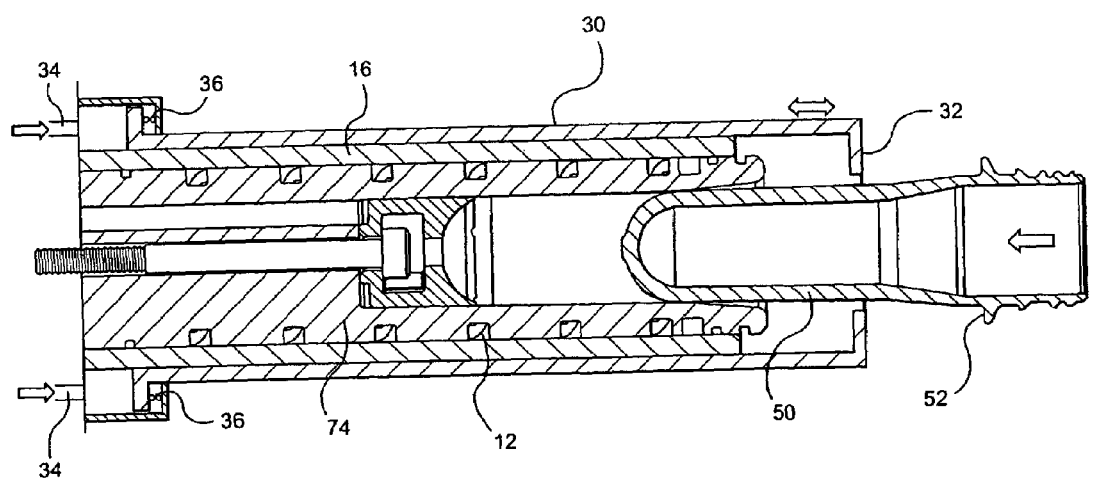
FIG. 10 illustrates a further embodiment of the invention where the suction sleeve extension includes an ejector.
Figure 11A:
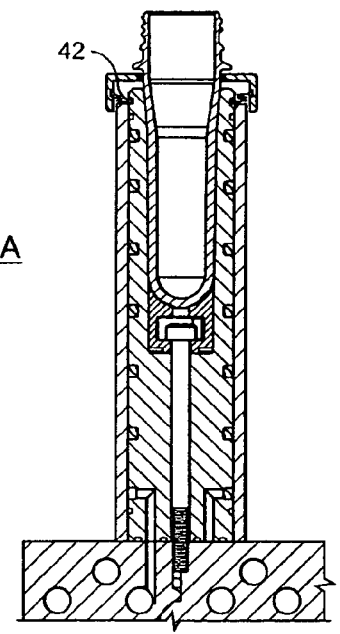
FIGS. 11A and 11B illustrate a further embodiment of the invention where the suction sleeve extension is a collapsible membrane such as a bellows.
Figure 11B:
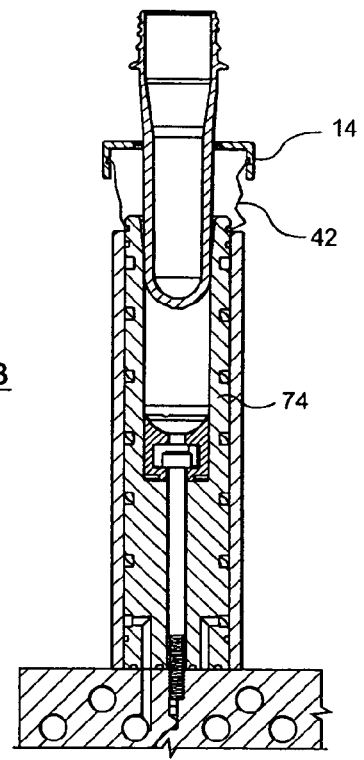

Although the simplest and most practical manner of implementation of the invention at this time has been described, there are many other ways in which the benefits of the invention can be achieved. FIGS. 10, 11A and 11B and the following description describe some of these alternative embodiments.

In the embodiment illustrated in FIG. 10, a modified suction sleeve extension 30 has replaced the ejector rail 14. The sleeve extension 30 includes an inwardly extending ring portion 32 that is adapted to engage a ridge area 52 on a molded part 50. A pneumatic inlet 34 is provided on take-off plate 72 and, when activated, drives extension 30 into its extended position to receive a molded part 50. When pneumatic inlet 34 is deactivated, return springs 36 at the base of extension 30 return extension 30 to its retracted position.

The embodiment shown in FIG. 10 operates in the same manner as the previously described embodiment with the exception that the ring portion 32 acts as the ejection mechanism for ejecting the parts 50 out of the take-off tubes 74.

In the embodiment illustrated in FIGS. 11A and 11B, a collapsible membrane such as a bellows 42 replaces the sleeve 18. The collapsible membrane is attached to the ejector rail 14 at one end and to the tube 74 at the other end. In this embodiment, the bellows 42 extends and collapses with the movement of the ejector rail 14 to thereby operate in a manner analogous to the manner in which the sleeves 18 move in the first described embodiment.

In yet another embodiment of the invention (not shown), the sleeve 16 (see FIG. 3) forming the outer wall of tube 74 is made to reciprocate and thereby performs the advantageous function of providing an extensible suction structure. The coolant channel 12 is located between ring seals such that, as the sleeve 16 is reciprocated, the cooling channel 12 remains confined between the seals. The forward portion of the sleeve includes a ring portion adapted to engage a ridge area 52 on a molded part 50 to eject the part 50 from the tube 74, as described in a previous embodiment.

In operation, the sleeve extends to receive parts 50 and then retract as the part 50 is drawn into the tube 74. When the parts are fully loaded into the tubes 74, the take-off device can then be withdrawn from between the mold halves. When the take-off device is fully withdrawn, the sleeve can again be extended to eject the parts 50 from within the tubes 74.

In yet another embodiment (not shown), the ejector rail 14 and the suction sleeves 18 are replaced by a single integral unit.

Other embodiments of the invention (not shown) include alternative ejecting means that do not necessarily rely upon ejector rails or the like to eject the preforms from their tubes (e.g. ejector pin acting through the base of the hollow tube, or may be simply the application of positive air pressure through the suction port). It is considered that these embodiments include all previously described embodiments of the invention with the provision that the aperture of the ejector means (e.g. aperture 26 of ejector rail 14 in FIG. 8) need not interact with the lip 52 of the preform 50 (FIG. 5).

A method according to the present invention for depositing a plurality of molded articles in a corresponding plurality of tubes includes the steps of causing relative movement between a plurality of suction channel extensions and the plurality of molded articles to form a plurality of extended suction channels between respective outer surfaces of the plurality of molded articles and surfaces of the corresponding tubes, and providing a suction force to an interior of each of the tubes to cause the plurality of molded articles to move into the plurality of tubes. The method may further include the step of causing further relative movement between the plurality of suction channel extensions and the plurality of molded articles as the molded articles are moved into the plurality of tubes. Wherein the step of causing further relative movement may include the step of moving a plurality of rigid cylinders in the same direction as the movement of the plurality of molded articles into the plurality of tubes, or may include the step of at least partially collapsing a plurality of collapsible cylinders.

As the above embodiments illustrate, the present invention provides a method and apparatus for efficiently and reliably ejecting molded plastic preforms from the core, thereby reducing, cycle time and manufacturing cost.

While the present invention shortens the manufacturing time of blow molded container preforms generally having circular cross-sectional shapes perpendicular to its axis, those skilled in the art will realize the invention is equally applicable to other molded products possibly with non-circular cross-sectional shapes, such as, pails, paint cans, tote boxes, and other similar products requiring a similar general configuration and mold-design characteristics as with the preform injection mold.

The individual components shown in outline or designated by blocks in the attached drawings are all well-known in the injection molding arts, and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

All U.S. and foreign patent documents discussed above are hereby incorporated by reference into the Detailed Description of the Preferred Embodiment.

What is claimed is:

1. A method of transferring a molded article from an injection mold into a molded article support structure arranged on a take-off device, the support structure including a suction structure for configuring a suction channel therealong and a suction channel extension having a portion that is selectively extensible relative to a distal end of the support structure for extending the suction channel into a region between the distal end of the support structure and the injection mold for assisting with the transfer of the molded article therebetween, the transfer method including the steps of:

positioning the molded article support structure adjacent the molded article in the injection mold;

extending the suction channel extension into the region between the distal end of the support structure and the injection mold;

providing a suction force along the suction channel to draw the molded article into the support structure; and retracting the suction channel extension when the molded article has been received in the support structure while contemporaneously maintaining the suction force so that the molded article is fully drawn into the support structure.

2. The method according to claim 1, wherein the step of retracting the suction channel extension is performed is moved into the support structure.

3. The method according to claim 1, wherein the suction channel extension is a sleeve, and wherein the step of retracting comprises the step of moving the sleeve in the same direction as the movement of the molded article into the support structure.

4. The method according to claim 1, wherein the suction channel extension is a collapsible membrane, and wherein the step of retracting comprises the step of at least partially collapsing the collapsible membrane.

5. The method according to claim 1, wherein the step of retracting the suction channel extension is performed when the molded article has been fully received in the support structure.

\* \* \* \* \*